| (12) | United States Patent | (10) Patent No.: | US 9,899,807 B2 |
|---|---|---|---|
| | Roth | (45) Date of Patent: | Feb. 20, 2018 |

(54) SWITCHING DEVICE AND SWITCHING DEVICE ARRANGEMENT

(71) Applicant: Ellenberger & Poensgen GmbH, Altdorf (DE)

(72) Inventor: Herbert Roth, Altdorf (DE)

(73) Assignee: Ellenberger & Poensgen GmbH, Altdorf (DE)

( * ) Notice: Subject to any disclaimer, the term of this patent is extended or adjusted under 35 U.S.C. 154(b) by 0 days.

(21) Appl. No.: 15/601,148

(22) Filed: May 22, 2017

(65) Prior Publication Data

US 2017/0256921 A1    Sep. 7, 2017

Related U.S. Application Data

(63) Continuation of application No. PCT/EP2015/071376, filed on Sep. 17, 2015.

(30) Foreign Application Priority Data

Nov. 21, 2014   (DE) .................... 20 2014 009 245 U

(51) Int. Cl.
| H01H 9/20 | (2006.01) |
| H01H 9/02 | (2006.01) |
| H01H 19/04 | (2006.01) |
| H02B 1/056 | (2006.01) |
| H02B 1/04 | (2006.01) |
| H02K 7/14 | (2006.01) |

(52) U.S. Cl.
CPC .............. H02B 1/056 (2013.01); H02B 1/04 (2013.01); H02K 7/14 (2013.01)

(58) Field of Classification Search
CPC ........ H01H 9/20–9/267; H01H 50/323; H01H 2050/049; H01H 2050/325; H01H 1/22; H01H 9/02; H01H 19/04; H01H 19/08; H01H 19/10; H01H 21/04; H01H 21/18; H01H 21/282
USPC ............... 335/159–163; 200/61.62, 244, 293
See application file for complete search history.

(56) References Cited

U.S. PATENT DOCUMENTS

| 6,572,403 B2 * | 6/2003 | Reimund ............. H01R 25/006 439/507 |
| 7,173,809 B2 * | 2/2007 | Bauer .................. H01R 9/2675 361/611 |
| 7,414,828 B2 | 8/2008 | Birner |
| 7,942,692 B2 * | 5/2011 | Bodenmeier ........ H01H 1/5844 439/511 |
| 9,112,318 B2 | 8/2015 | Cech et al. |
| 2012/0149237 A1 * | 6/2012 | Gan ..................... H01H 50/048 439/507 |

(Continued)

FOREIGN PATENT DOCUMENTS

| AU | 2003264621 B2 | 6/2004 |
| DE | 20 2004 008 141 U1 | 11/2005 |

(Continued)

*Primary Examiner* — Gary Paumen
(74) *Attorney, Agent, or Firm* — Muncy, Geissler, Olds & Lowe, P.C.

(57) ABSTRACT

A switching device having a housing and a contact carrier which is pivotable about a rotational axis, the rotational axis being in particular fixed to the device or the housing, the contact carrier comprising at least one coupling contact for producing or opening a power- and/or signal-carrying contact connection with at least one attached switching device.

8 Claims, 4 Drawing Sheets

(56) References Cited

U.S. PATENT DOCUMENTS

2013/0048477 A1    2/2013   Rahn et al.

FOREIGN PATENT DOCUMENTS

| DE | 603 10 351 T2 | 5/2007 |
|---|---|---|
| DE | 10 2007 027 522 B3 | 2/2009 |
| DE | 20 2011 000 835 U1 | 12/2011 |
| DE | 10 2011 110 184 A1 | 2/2013 |
| DE | 20 2013 003 925 U1 | 8/2013 |
| EP | 2 019 407 A1 | 1/2009 |
| WO | WO 2013/052366 A1 | 4/2013 |

\* cited by examiner

SWITCHING DEVICE AND SWITCHING DEVICE ARRANGEMENT

This nonprovisional application is a continuation of International Application No. PCT/EP2015/071376, which was filed on Sep. 17, 2015, and which claims priority to German Patent Application No. 20 2014 009 245.1, which was filed in Germany on Nov. 21, 2014, and which are both herein incorporated by reference.

BACKGROUND OF THE INVENTION

Field of the Invention

The invention relates to a switching device, in particular in the form of an attached electrical switching device or a series installation device, and in particular to a switching device arrangement with preferably several such switching devices, electronic circuit breakers, protective switches, (electronic or electromechanical) relays or the like.

Description of the Background Art

An electrical switching device, such as a protective switch, a mechanical, electronic or mechatronic switch or a relay, usually has a supply connection, via which a mains-side and thus power-carrying power line can be connected, and a load connection via which a power line leading out at the load side can be connected.

Below, an electrical installation with a plurality of electrical load circuits, which are supplied with power from a common main power line and which are connected to a common power return, is generally designated as a switching device arrangement or power distribution system with a plurality of switching devices. In other words, the power distributor is an electrical circuit device which makes it possible to distribute electrical power supplied via a common main power line to a plurality of parallel load circuits, wherein safety mechanisms are provided which individually protect each load circuit against overload and/or short circuit.

Within the scope of such an arrangement of switching devices which can be connected in series, the switching devices are usually provided, in particular in terms of circuitry, at the branch points at which the load circuits branch off from the main power line. In this case, the switching device serves to separate the assigned load circuit from the power-carrying main power line, if necessary.

Such an arrangement, which is arranged on a DIN rail (top hat rail) of connectable switching devices, for example, is usually produced from individual protective switches as well as possibly from one or more supply terminals. The protective switches and the supply terminals can be individually wired by flexible lead wires. As a result of the individual wiring, the assembly of such a power distributor is comparatively complex. The circuit system formed in this case is also comparatively unclear, which makes subsequent modification to an already installed power distributor and the detachment of a single switching device for the purpose of its replacement, particularly for reasons of safety or contact protection, more difficult.

In terms of a comparatively simple connection of a plurality of parallel load circuits, the supply terminal comprises, in the case of switching devices which are designed as series installation devices, a coupling connection which can be contacted with a power-carrying bus bar which engages over several switching devices. In such an installation, the signal power guidance can either occur separately from the switching devices by means of separate switching elements or, according to DE 10 2007 027 522 B3, also by means of bus bars (signal power rails).

A power distributor is known from DE 20 2004 008 141 U1, which corresponds to U.S. Pat. No. 7,414,828, which is incorporated herein by reference, and in which a number of protective switches can be plugged onto a base, which are provided with corresponding plug-in locations. The common main power line as well as branch lines of the individual load circuits emanating from each plug-in slot are integrated in the base. However, for such a power distributor, a corresponding slot must necessarily be present in the base for each protective switch. A power distributor of the type mentioned is therefore comparatively multipartite and thus expensive in terms of production. The division of the power distributor into base part, on the one hand, and connected protective switches on the other, also requires a comparatively large overall installation height, which limits the range of application of the power distributor.

SUMMARY OF THE INVENTION

It is therefore an object of the invention to specify a particularly suitable switching device for side by side mounting. This should be suitably compact and simple. A switching device arrangement or device constructed with at least two such switching devices or with a feed module and at least one further switching device is to be as easy to operate and to mount as possible, and particularly secure in terms of operation. Furthermore, the device should have as few parts as possible, which are as captive as possible, but in particular, as far as possible, should have no additional parts at all.

In an exemplary embodiment, a switching device, which is preferably mounted side by side with further switching devices along and on a DIN rail (top hat rail), is provided with a contact carrier, which can be pivoted about a rotational axis, with at least one coupling contact for producing or for releasing a power-carrying contact connection with at least one attached switching device. The axis of rotation is suitably provided in the region of a housing corner and is preferably formed by pivots which are integrally formed on the contact carrier and which engage in bearing points (bearing bushes) on the housing side or engage rotatably there. However, other types of device-side bearing points are also conceivable.

The contact carrier, preferably of each switching device, is suitably arranged to be pivotable on a narrow side of a device housing. A switching device of the type mentioned, in particular a switching device provided for the DIN rail mounting, basically has two large-surface housing sides, with which the switching devices mounted side by side are arranged adjacent to one another, and four narrow sides, of which one narrow side is designed as a device base for the DIN rail mounting. On a further narrow side, openings are provided for or with connections or connection terminals for the connection of conductors carrying power and possibly signals during device operation.

Suitably, the respective contact carrier is now arranged so as to be pivotable on one of the remaining narrow sides. If the narrow side designed for the connections lies opposite the narrow side serving as the device base, the narrow side assigned to the contact carrier is preferably the narrow side of the device housing which is accessible as the top side in the installed state of the switching device.

In an embodiment, the pivotable or rotatable contact carrier is designed as a cover part of a housing narrow side, namely the housing top side. Expediently, the contact carrier has a cover part which carries the or each coupling contact as a first carrier leg and an engaging part, in particular integrally formed thereto, as a second carrier leg which is preferably formed at right angles to the first carrier leg. In the course of pivoting the contact carrier, the engaging part or the carrier leg engages in a corresponding joining recess of the device housing.

An embodiment provides that the or each coupling contact can be designed as a spring contact, which contacts with a counter contact inside the device in the course of pivoting. Suitably, the spring contact is designed to be two-armed with concavely curved spring limbs, the curvatures of which face one another in order to produce a reliable contact force. The respective coupling contact expediently contacts a device-internal counter contact. The latter preferably has a first contact leg for contacting this coupling contact and a second contact leg which is used for contacting a coupling contact of a stacked switching device. Advantageously, the counter contact has a spring contact leg for contacting, in particular clamp contacting, with a device-internal printed circuit board contact or electronic contact.

The switching device can comprise a housing (device housing) and a connection for power and/or signal guidance, in particular to or from a device-internal device electronics, which is accessible via a housing side, in particular via a housing narrow side. A pivoting mechanism has at least one coupling contact, which is provided and arranged for the preferably device-selective opening and closing of a contact connection. The contact connection leads to a connected switching device or module (feed module) so that a power and/or signal guidance connection is established between the attached switching devices when the contact connection is closed by a corresponding pivoting-in or pivoting of the coupling contacts in the closing direction (contacting direction). The signal connection is suitably bidirectional and can be designed as a data bus or signal bus.

The switching device arrangement can have a number of switching devices and preferably at least one feed module as a special switching device, which switching devices each have a housing and at least one connection, accessible via a housing side, for power and/or signal guidance. A pivoting mechanism having a number of coupling contacts serves to, in particular device-selectively, open and close a contact connection between the connected switching devices and/or modules. The pivoting mechanism can comprise a number of contact carriers reduced by one (1) as compared to the number of attachable switching devices. These are preferably pivotable separately from one another, that is to say individually, around the same axis of rotation and/or coaxially thereto.

The or each switching device can comprise electronics with a printed circuit board, which can be equipped with electronic and/or electronic components and which, in turn, has contact points for the energy flow guidance and for the signal power guidance. The electronics can be provided and configured for active power limitation and/or for overload and/or short circuit disconnection. Also conceivable are attachable switching devices with a pure switching and/or relay function.

Suitably, at least one feed module for the power and/or signal power supply and at least one further switching device are provided in the switching device arrangement. Said module can, for example, have a relay function for switching power and/or signal contacts, while a subsequent or further switching device is configured only or primarily for error detection (overload, short circuit), wherein a corresponding fault signal is passed on to the switching device having the relay function for purposes of triggering it.

Advantages achieved with the invention include that, in the case of a switching device (protective switch, relay or the like) with a pivotable contact carrier, no additional parts in the form of connecting lines, bus bars or the like must be provided in order to produce a through-connection of attached switching devices. In addition, exchanging one or more switching devices in a switching device arrangement is made particularly simple in that only the individual contact carrier of this switching device has to be pivoted in order to release the contact connection with the other switching devices.

Furthermore, virtually any desired number of switching devices can be arranged in series without providing DIN rail connections or line connections of different lengths.

Furthermore, there is no need for screwed contact connections for interconnected or collective contacting of the switching devices, which further simplifies assembly and disassembly of the switching devices. The housings of the connected switching devices can therefore advantageously be designed closed and without contact with their housing sides, which are located adjacent to another in the row arrangement.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
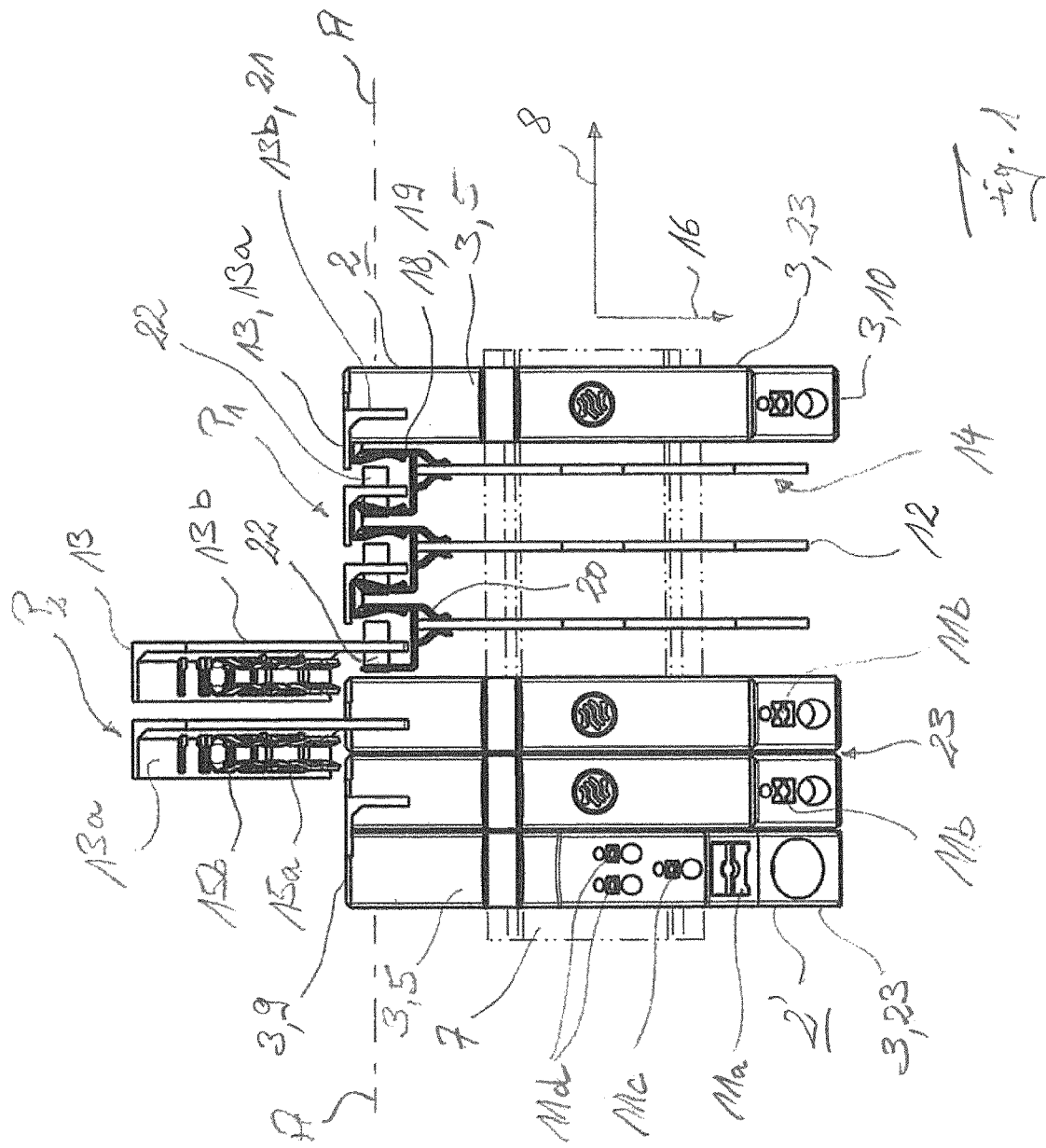
FIG. 1 is a front view of an arrangement of a plurality of connected switching devices with pivotable contact carriers for the contact connection of the switching devices among themselves and with a feed module as input switching device, FIG. 2 in a first side view, illustrates a switching device with a pivoted-out contact carrier with a view to coupling contacts carried by the latter, FIG. 3 in a side view situated opposite from FIG. 1, illustrates the switching device with the pivoted-out contact carrier with a rear side view of its engagement leg, FIG. 4 in an illustration according to FIG. 1, illustrates the switching device arrangement in a side view with a view to a connection side of the switching devices, FIG. 5 in a further side view, illustrates the switching device arrangement according to FIG. 4, with a view to the housing or device narrow sides closed by means of the pivotable contact carriers.
Figure 2:
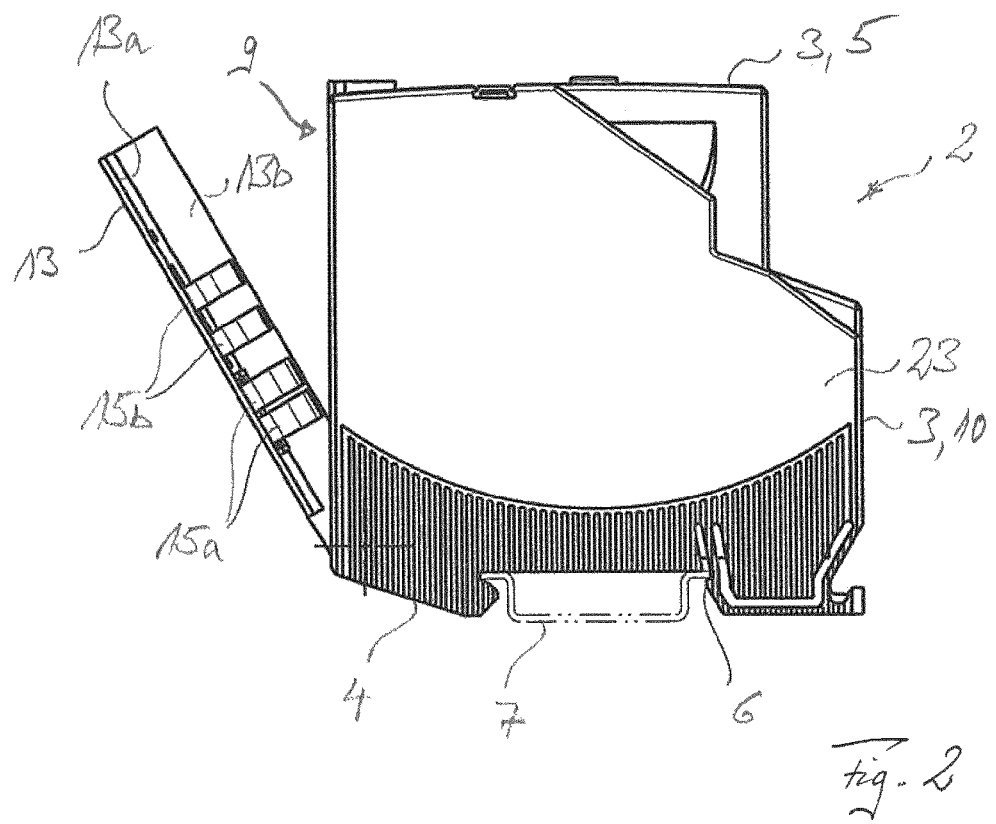
Figure 3:
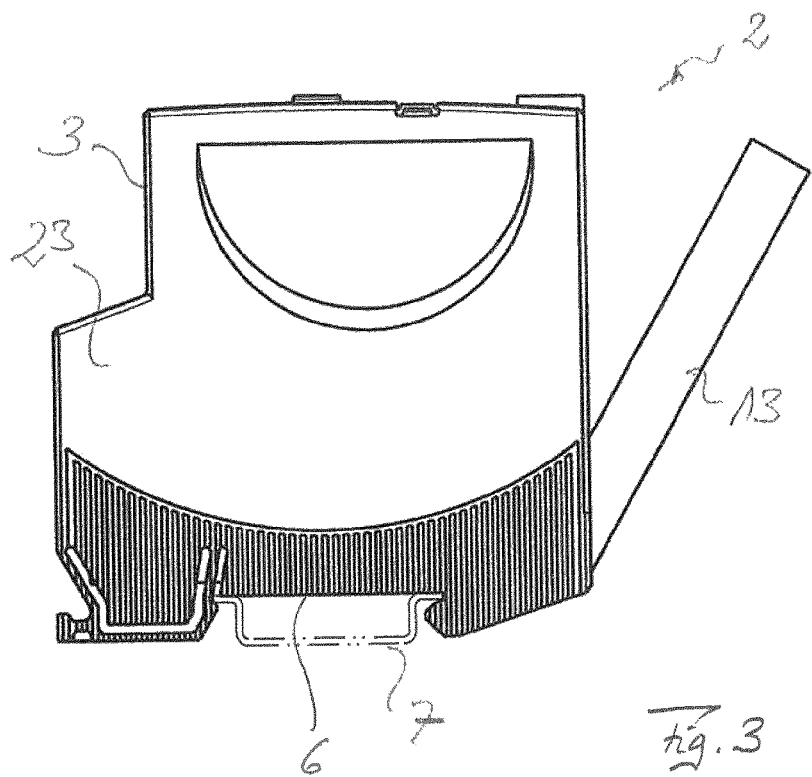

The switching device arrangement 1 shown in FIG. 1 comprises a number of switching devices 2 arranged one after the other, as is shown in FIGS. 2 and 3 in different side views. The respective switching device 2 comprises a housing 3 made of insulating material, for example plastic. The switching device 2 is designed as a DIN rail-mounted device and has a stepped housing shape, which is typical for such devices, with a housing base which is terminated by a mounting narrow side 4. The switching device 2 designed for a defined installation position is facing the rear wall of a switching cabinet with this mounting-end or rear-side housing narrow side (housing rear side) 4, while the front-side housing narrow side (housing front side) 5, which is visible in FIG. 1, is turned towards an operator when looking into the switching device cabinet in the installation position. For mounting, the switching device 2 has a snap-in groove 6 on the rear-side housing narrow side 4, with which the respective switching device 2 can be snapped onto a DIN rail 7.

Figure 4:
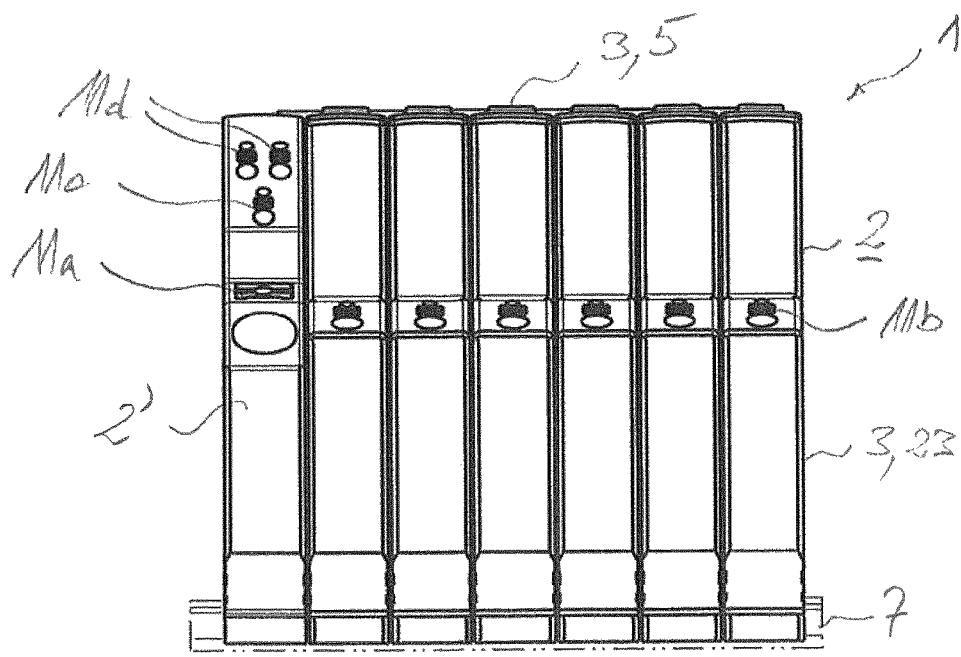

The profile axis of the DIN rail 7 defines a row direction 8, along which several switching devices 2—as shown in FIGS. 1, 3 and 4—can be aligned with one another by being snapped onto the DIN rail 7. The side faces of the housing 2 which are perpendicular to the row direction 9 are hereinafter referred to as front-side housing narrow sides 9, 10. The upper housing narrow side 9 in FIG. 1 forms a contacting and pivoting mechanism side of the switching devices 2, the contacting and pivoting mechanism side of which is shown in plan view in FIG. 4.

In order to supply power, at least one of the switching devices 2, which is hereinafter referred to as the feed module 2', comprises a feed terminal (power/voltage plus terminal) 11a, which is arranged in the region of the housing front side 5 according to FIG. 1. The feed terminal 11a comprises a connection terminal, for example, designed as a screw or insulation displacement terminal, to which a flexible wire or stranded conductor can be connected for power supply. The feed terminal 11a is connected (contacted) internally with a device contact, for example, to a printed circuit board 12 of a device electronics system. The contact connection of all switching devices 2 with this feed terminal 11a takes place by means of contact carriers 13 of each switching device 2. The respective contact carrier 13 is pivotally mounted on the housing 3 of the respective switching device 2. The position of the pivot axis or axis of rotation designated by A is indicated in FIG. 2 by the crossed lines in the lower left corner region of the switching device 2 shown there.

The switching device 2 further comprises a load output 11b, to which a feed line of a load circuit (or consumer circuit) can be connected. For the connection of the feed line, the load output 11b comprises a connection terminal which is accessible from the corresponding housing narrow side or housing front side 10, 5, which can also be designed as a screw or insulation displacement terminal. In addition to the described terminals 11a, 11b, the switching device 2 comprises a ground connection 11c and two signal connections (I/O) 11d. In the interior of the housing 3, the feed terminal 11a and the load terminal 11b, as well as the connections 11c, 11d, are connected to one another via a switching device (not further shown) and/or a device electronics 14 comprising the printed circuit board.

The respective electrically, electromechanically or electronically implemented switching device can realize a protective switch function, for example against overload, short circuit and/or power limiting in order to separate the power path formed between the feed terminal 11 and the load terminal 11b in the event of an overcurrent. The switching device can be based on a magnetic, thermal, electronic and/or pneumatic operating principle according to conventional technology.

Figure 6:
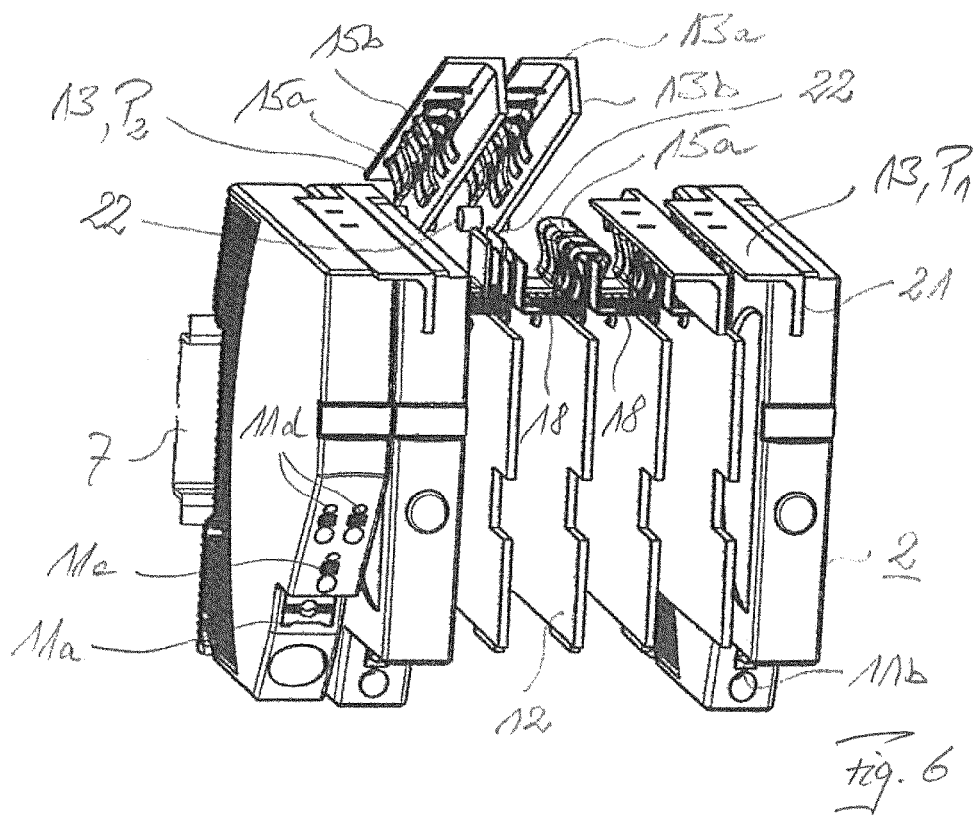
FIG. 6 illustrates a switching device arrangement according to FIG. 1 in a first perspective view, with four removed device housings as well as two open (pivoted-out) and two closed (pivoted-in) contact carriers.
Figure 7:
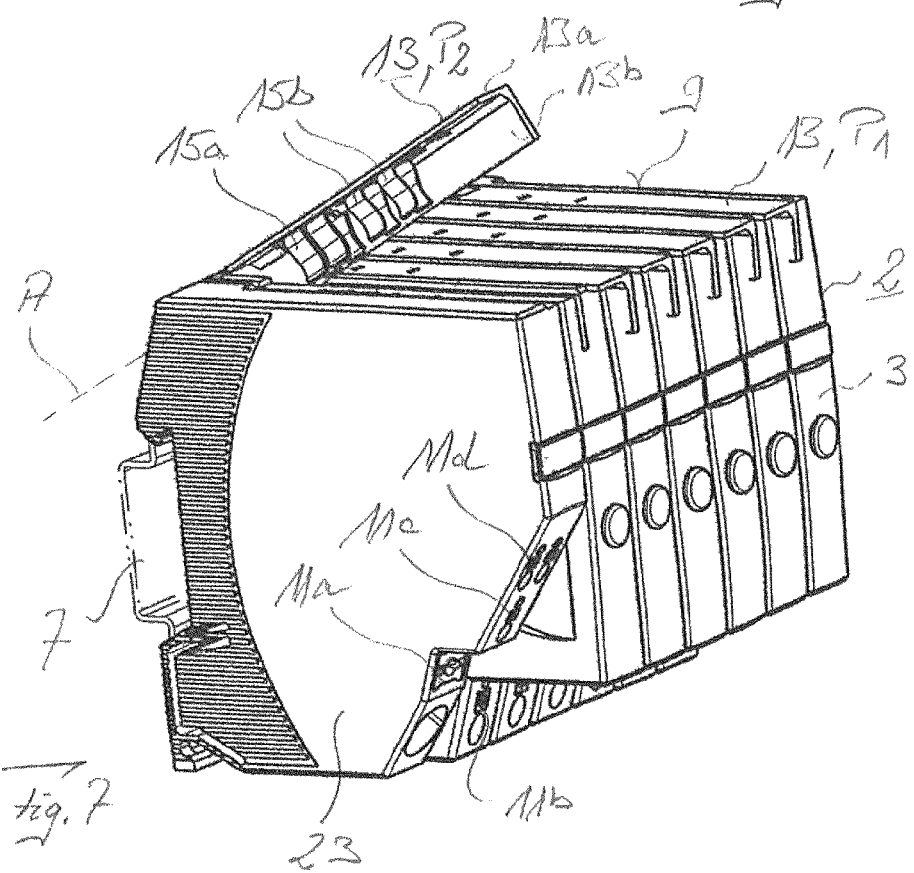
FIG. 7 illustrates a switching device arrangement according to FIGS. 1 and 4 to 6, in a second perspective illustration without removed device housings as well as with one open and five closed contact carriers.

As can be seen from FIGS. 1 and 2 as well as FIGS. 6 and 7, the respective contact carrier 13 carries several coupling contacts 15a, 15b in the exemplary embodiment. These are arranged behind or next to one another in the transverse position 16, extending transversely to the direction of the row 8 in the pivoted-in position (swung-in and contact position) $P_1$ shown on one of the switching devices 2. In the case of two of the switching devices 2, the contact carriers 13 are located in the pivoted-out position (swung-out and contact-opening position) $P_2$. To indicate the contact connection between adjacent switching devices 2, three switching devices 2 only show their device-internal printed circuit boards 17 with the housing 3 (not shown).

The coupling contacts 15a, 15b serve for power guidance or for signal or signal power guidance and are suitably designed as two-armed spring contacts. Their spring limbs have mutually facing convexities and are cranked outwards on the free end. This facilitates or improves the contacting of the coupling contacts 15a, 15b in the course of the pivoting operation in the contacting direction, in the manner of an insertion aid for reliable contacting with device-internal counter contacts 18.

The device-internal counter contacts 18 are U-shaped, wherein in each case one of the spring limbs of the coupling contacts 15a, 15b engages over one of the U-legs 19 during contacting, while the other spring limb of the respective coupling contact 15a, 15b engages over the other U-leg 19 in a contacting manner. In this way, the contact connections between the adjacently attached switching devices 2 are established.

On the side facing away from the U-legs, the counter contacts 18 also have contact legs 20 configured as spring limbs. With these, contacting ensues by engaging over the printed circuit board 2 and by clamp contacting with contact points of the respective circuit board 12 (not further shown).

The respective contact carrier 13 is designed as a plastic part which is L-shaped in cross-section. One of the L-legs (support legs) 13a supports the coupling contacts 15a, 15b on the inside and practically forms a cover plate for closing the contact side (housing narrow side 9 of the housing 3) of the respective switching device 2. In this case, the carrier leg 13a also partially engages over the adjacent switching device 2 as a cover plate. The further (second) L-leg 13b of the contact carrier 13 extends perpendicularly to the other (first) L-shaped or carrier leg 13a and is suitably shaped thereon. In the closing and contact state or in the corresponding position $P_1$, the contact carrier 13 engages in a housing slot 21 of the respective housing 3 of the switching device 2.

Bearing pins 22, which in a manner not shown in detail engage in corresponding bearing bushes on the respective inner sides of those housing sides 23, with which housing sides 23 the switching devices 2 lie against one another in their juxtaposition, are formed on the L-legs or carrier legs 13b acting as the engaging part. Alternatively, in kinematic reversal, the bearing pins can also be formed on the inside of these housing sides 23, whereas the bearing bushings are then provided on the contact carrier 13 and there on its carrier legs 13b serving as the engaging part.

Figure 5:
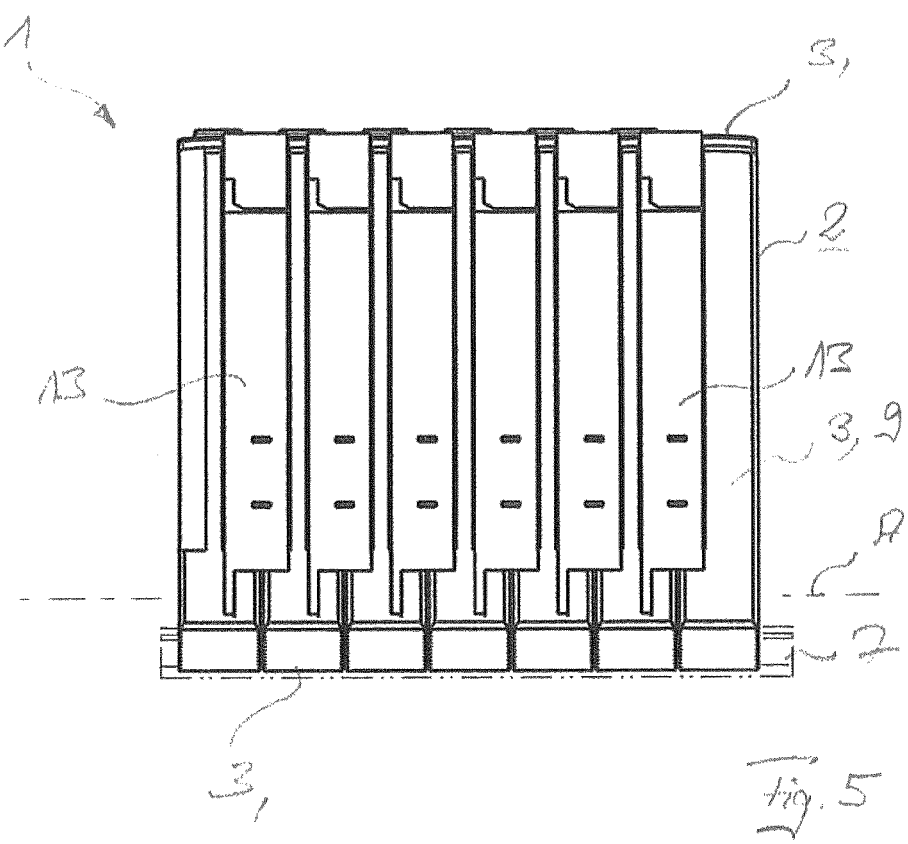

FIGS. 4 and 5 show the switching device arrangement 1 with contact carriers 13, which are pivoted in the closed position and thus in the contact position $P_2$. These form a corresponding pivoting mechanism in their entirety, in which each individual contact carrier 13 can be pivoted into the open position $P_2$ separately from the closed position $P_1$ that is shown. In FIGS. 6 and 7, the spring-like arched coupling contacts 15a, 15b are reasonably clearly recognizable.

The invention is not limited to the embodiment described above. Rather, other variants of the invention can also be derived from those skilled in the art without departing from the scope of the invention. In particular, all the individual features described in connection with the exemplary embodiment can also be combined with one another in another manner without departing from the subject matter of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A switching device comprising:
   a housing; and
   a contact carrier coupled to the housing so as to be pivotable about a rotational axis; and
   at least one coupling contact for producing or opening a power and/or signal-carrying contact connection with at least one switching device connected in series,
   wherein the contact carrier is a cover part of a housing narrow side of the housing and is formed for partial engagement over the attached switching device,
   wherein the cover part supports the coupling contact, and
   wherein the coupling contact contacts a device-internal counter contact, which comprises a first contact leg for contacting this coupling contact and a second contact leg for contacting a coupling contact of the attached switching device.

2. The switching device according to claim 1, wherein the contact carrier has an engaging part, which engages in a corresponding joining recess of the device housing in a course of the pivoting of the contact carrier.

3. The switching device according to claim 2, wherein the engaging part is integrally formed on the cover part of the contact carrier.

4. The switching device according to claim 1, wherein the coupling contact is a spring contact, which contacts the device-internal counter contact in a course of pivoting.

5. The switching device according to claim 4, wherein the coupling contact is a two-armed spring contact.

6. The switching device according to claim 1, wherein the device-internal counter contact, which the coupling contact contacts, has a spring contact limb for contacting a device-internal printed circuit board contact or electronics contact.

7. The switching device according to claim 1, wherein the contact carrier has at least one bearing pin, which sits in a bearing bush of a housing side wall.

8. A switching device arrangement comprising:
   a plurality of switching devices according to claim 1, which are connected in series in particular on a DIN rail or top-hat rail of which a respective device-internal counter contact is accessible via a housing side for power and/or signal guidance,
   wherein the coupling contact is provided and arranged as a pivot mechanism for the device-selective opening and closing of the contact connection between the connected switching devices and/or a feed module.

* * * * *